Figure 2:
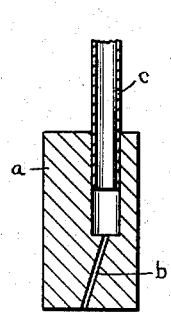

Aug. 8, 1950     C. DOD     2,517,642

OXYGEN JET METAL CUTTING NOZZLE

Filed Feb. 13, 1947

INVENTOR.
CEDRIC DOD
BY
Hyde, Meyer, Baldwin & Doran
ATTORNEYS

Patented Aug. 8, 1950

2,517,642

UNITED STATES PATENT OFFICE 2,517,642

OXYGEN JET METAL-CUTTING NOZZLE

Cedric Dod, Giffnock, Scotland

Application February 13, 1947, Serial No. 728,275
In Great Britain February 19, 1946

3 Claims. (Cl. 158—27.4)

This invention has reference to oxygen jet metal cutting nozzle formations.

In oxygen jet metal cutting nozzle formations there is a combined heating jet by which an oxygen acetylene or other flame is directed on the metal to be cut and a cutting jet by which oxygen is directed on the heated metal to cut therethrough.

In the standard type of such nozzles in normal use the heating jet surrounds the cutting jet either as a complete annulus or as a series of jets.

In cutting plates on the bevel by means of such nozzles the nozzle is tilted relative to the plate and in accordance with the angle of the bevel, the cutting jet and heating flame being directed at the same angle on to the plate.

It has been proposed to cut steel at a bevel by means of a cutting burner having a combined concentric heating and cutting jet, which can be adjusted in accordance with the angle of cut, in combination with an auxiliary or preheating jet located in advance of the combined heating and cutting jet and arranged to direct a heating flame at about right angles to the face of the plate being cut. In using such burners the metal being cut is preheated by the auxiliary jet located in advance of the combined heating and cutting jet which latter is necessary to heat the plate to a sufficiently high temperature and is liable to overheat the acute angle or under bevel of the cut to thereby cause melting at the corresponding edge.

The present invention has for its object to provide an improved nozzle formation for cutting plates on the bevel, which will enable the cut to be more speedily effected, or effected with economy in the consumption of heating gas, or to give a combination of such results. Another object of the invention is to provide improvements whereby both sides of the cut will be sharp and well defined.

According to the present invention in an oxygen jet metal cutting nozzle formation for cutting metal plates at a bevel the oxygen jet directs the oxygen on to the line of cut and at the angle corresponding to the bevel to be cut and the heating jet or jets directs, or direct the heating flame or flames so as to heat the metal more on one side of the line of cut than the other, the side which receives the lesser amount of heat being that towards which the oxygen is directed and which will form the acute angle of the bevel.

The invention further consists in an oxygen jet metal cutting nozzle formation as set forth in the preceding paragraph wherein the heating jet or jets are located wholly or mainly in advance of the cutting jet and directs a heating flame or flames on to impinge more on one side of the line of cut than the other side thereof, the side receiving the lesser amount of heat becoming the acute angle of bevel cut by the oxygen.

The invention also consists in an oxygen jet metal cutting nozzle formation as set forth in either of the preceding paragraphs having a slit or series of orifices to direct a narrow heating flame or combination of flames located in alignment in advance of the cutting jet, the centre line of said flame or combination of flames where it impinges on the metal being offset with respect to the cutting jet of oxygen wherein it impinges on the line of cut.

The cutting jet while cutting at a bevel may be directed at an angle forwardly in the line of cut.

Figure 1:
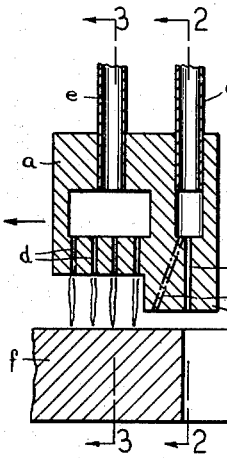

The invention will now be described with reference to the annexed drawing wherein:

Figure 1 is a sectional elevation of one construction of the nozzle formation in accordance with the invention.

Figure 3:
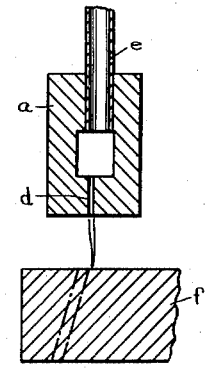

Figures 2 and 3 are sections on the lines 2—2 and 3—3 respectively of Figure 1.

Figure 4:
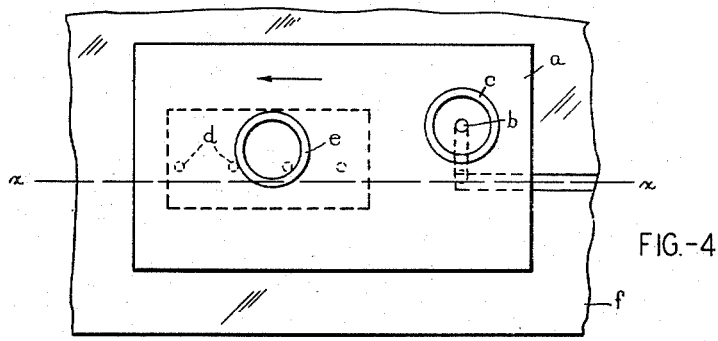

Figure 4 is a plan view to a larger scale of the nozzle formation.

Figure 5:
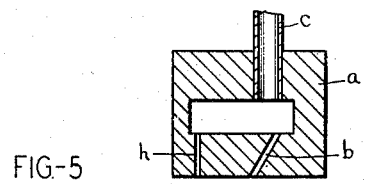
Figure 6:
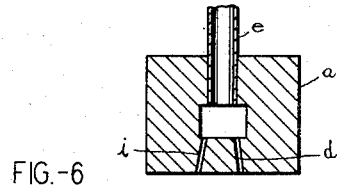

Figure 5 is a transverse section through the cutting jets of a nozzle formation in accordance with the invention having two cutting jets, and Figure 6 is a transverse section through the heating jets of the nozzle formation shown in Figure 5. The arrow shown at the left center of Fig. 1, and the arrow shown on the upper center of Fig. 4, indicate the direction of movement of the respective cutting nozzles.

The improved nozzle formation shown in Figures 1 to 4 is in the form of a unit $a$ having a cutting jet $b$ supplied through a pipe connection $c$ and through which the oxygen issues and a plurality of heating jets $d$ supplied through a pipe connection $e$ and through which issues the heating gas. The cutting jet is a cutting jet solely and not a combined heating and cutting jet.

A sheet of metal being cut on a bevel is designated by the letter $f$.

The cutting jet $b$ is offset or angled to an extent depending on the angle of bevel to be cut, so that the oxygen jet is directed at a corresponding angle on to the metal being cut. Further the under face of the nozzle is stepped as at $g$, the cutting jet being located in the stepped down end so as to be nearer to the work to be cut than the heating jets.

When said nozzle formation is in operation the heating flame or combination of flames is or are directed on to the line of cut in the metal in advance of the cutting jet so as to raise the temperature of the metal to the required degree. The cutting jet of oxygen, following closely behind, cuts the metal at the desired bevel angle. But the heating jets $d$ are so positioned that the metal is heated more highly on the obtuse side than on the acute side of the cutting line as shown clearly in Figure 4 where $x$—$x$ is the centre line of the cut. That is, more heat is imparted to one side of the centre of the cutting line, the side which will become the obtuse side of the bevel cut, than to the other. In consequence thereof both the obtuse and acute sides of the bevel cut are sharp and clean.

The preferred degree in the difference to which the two sides of the centre of the cut is heated will be determined by experiment; preferably 80% of the heat is imparted to the obtuse side of the cut.

In bevelling at maximum speed with standard concentric combined nozzles a cyclical swinging cross cutting action is obtained but with the improved nozzle formation such action is not obtained or is obtained only when cutting at about twice the normal cutting speed.

The cutting jet may be directed forwardly in the line of cut as indicated at $b^1$.

If desired the nozzle formation may be provided with one or more additional cutting jets to produce a bevel and nose or a double bevel and nose on the finished cut edges, the heating flame being directed to heat one side of the centre of cut more highly than the other as aforesaid. Figure 5 shows an additional cutting jet $h$ arranged to direct the oxygen to cut at right angles to the face of the plate.

In the nozzle formation having cutting jets as shown in Figure 5 the heating jets are preferably as shown in Figure 6. That is the jets $d$ are inclined to direct the heating flames therefrom more on the obtuse side of the bevel being cut than on the acute side while the jets $i$ are arranged to direct the flames centrally on the square cutting line. It will be noted that in this nozzle formation the jets $d$ and $i$ are directed outwardly and downwardly with respect to each other so that the usual gas supply chamber within the nozzle formation can be kept small and the volume of gas within said chamber is likewise kept small. This reduces the effect of backfiring.

Having now particularly described and ascertained the nature of my said invention and in what manner the same is to be performed, I declare that what I claim is:

1. An oxygen jet cutting nozzle of the character described having a base surface which, when in cutting position is disposed adjacent the work to be cut, and having leading and trailing wall surfaces with relation to the normal direction of cutting movement, said nozzle having therewithin a heating gas chamber and a cutting gas chamber each in communication with a respective gas supply source, the base portion of said nozzle being perforated to provide a series of heating gas discharge passages aligned to lie within a single vertical plane intersecting said base and said leading and trailing wall surfaces, the inner ends of said passages communicating with said heating gas chamber and the outer ends of said passages opening through said base surface adjacent the leading end thereof, the wall of said base portion being further perforated to provide a cutting gas discharge passage communicating at its inner end with said cutting gas chamber and at its outer end opening through said base rearwardly of said heating gas discharge passages and laterally out of the plane of registry of said heating gas passages, said cutting gas passage being inclined convergently downwardly towards the plane of the heating gas passages whereby to be out of right angled relationship with the surface of the work when the nozzle is in normal cutting position with its heating gas passages normal to said surface, the heating gas passages being so disposed laterally of the cutting gas passage that the major portion of the heat is directed on the work on that side of the cut in which the angle of the cut with the work is obtuse.

2. A metal cutting nozzle of the type defined in claim 1 and wherein the cutting gas passage is also inclined forwardly out of right angled relationship with the upper surface of the work when the nozzle is in normal cutting position.

3. A metal cutting nozzle of the type defined in claim 1 in which the base surface is stepped in two planes out of alignment with each other, the outer end of the cutting gas passage emerging in one plane, and the outer ends of the heating gas passages emerging in the other plane, the plane in which the cutting gas passage emerges being closer to the work than the plane in which the heating gas passages emerge when the nozzle is in normal cutting position.

CEDRIC DOD.

REFERENCES CITED

The following references are of record in the file of this patent:

UNITED STATES PATENTS

| Number | Name | Date |
| --- | --- | --- |
| 1,377,001 | Bucknam | May 3, 1921 |
| 1,418,688 | Theberath | June 6, 1922 |
| 1,604,890 | Eastman et al. | Oct. 26, 1926 |
| 1,919,764 | Anderson | July 25, 1933 |
| 2,031,583 | Anderson | Feb. 25, 1936 |
| 2,129,672 | Bucknam | Sept. 13, 1938 |
| 2,202,130 | Wagner | May 28, 1940 |
| 2,322,300 | Linden | June 22, 1943 |

FOREIGN PATENTS

| Number | Country | Date |
| --- | --- | --- |
| 366,779 | Germany | Jan. 11, 1923 |
| 651,539 | Germany | Oct. 15, 1937 |